US009766792B2

(12) United States Patent
Buecker et al.

(10) Patent No.: US 9,766,792 B2
(45) Date of Patent: Sep. 19, 2017

(54) USER INTERFACE CONTROLLED BY ENVIRONMENTAL CUES

(71) Applicant: Core Wireless Licensing, S.A.R.L., Lusembourg (LU)

(72) Inventors: Martin Buecker, Dortmund (DE); Maxim Lobko, Cologne (DE); Marc Hoffmann, Dinslaken (DE); Edmund Coersmeier, Bochum (DE)

(73) Assignee: Core Wireless Licensing S.A.R.L., Luxembourg (LU)

( * ) Notice: Subject to any disclaimer, the term of this patent is extended or adjusted under 35 U.S.C. 154(b) by 0 days.

(21) Appl. No.: 14/733,910

(22) Filed: Jun. 8, 2015

(65) Prior Publication Data
US 2015/0268834 A1    Sep. 24, 2015

Related U.S. Application Data

(63) Continuation of application No. 13/750,894, filed on Jan. 25, 2013, now abandoned, which is a continuation of application No. 11/965,136, filed on Dec. 27, 2007, now Pat. No. 8,370,755.

(51) Int. Cl.
*G08G 1/0967* (2006.01)
*G06F 3/0484* (2013.01)
*G01C 21/36* (2006.01)

(52) U.S. Cl.
CPC ......... *G06F 3/04845* (2013.01); *G01C 21/36* (2013.01); *G06F 3/04842* (2013.01); *G08G 1/096716* (2013.01); *G08G 1/096725* (2013.01); *G08G 1/096758* (2013.01); *G08G 1/096783* (2013.01)

(58) Field of Classification Search
CPC ............ G06F 3/04845; G06F 3/04842; G08G 1/096716; G08G 1/096725; G08G 1/096758; G08G 1/096783; G01C 21/36
See application file for complete search history.

(56) References Cited

U.S. PATENT DOCUMENTS

| 6,112,075 | A | * | 8/2000 | Weiser ....................... 455/404.1 |
| 6,525,749 | B1 | * | 2/2003 | Moran et al. ................. 715/863 |
| 7,100,190 | B2 | * | 8/2006 | Johnson et al. .............. 725/105 |
| 7,209,807 | B2 | * | 4/2007 | Smith et al. ...................... 701/1 |

(Continued)

*Primary Examiner* — Ryan Pitaro
(74) *Attorney, Agent, or Firm* — Borden Ladner Gervais LLP

(57) ABSTRACT

A method comprises receiving a signal containing an environmental cue; correlating the environmental cue to a user interface control element; and generating a user interface control command based on the environmental cue. A device may be controlled by receiving a visual image, processing the image to identify a visual cue, correlating the visual cue with a user interface control, and controlling the device using the user interface control. The visual image may be received from a camera that is part of an automobile, and the user interface control may include a control for a radio to tune to a radio station; a speed control for controlling a speed of the automobile corresponding to a speed sign visual cue; or a navigation system control for controlling a navigation system based on traffic signs. Other variations include an apparatus and computer-readable media including instructions for performing the methods.

19 Claims, 5 Drawing Sheets

(56) References Cited

U.S. PATENT DOCUMENTS

| | | | |
|---|---|---|---|
| 7,596,602 B2* | 9/2009 | Ellman | 709/206 |
| 7,680,324 B2* | 3/2010 | Boncyk et al. | 382/165 |
| 7,873,187 B2* | 1/2011 | Schofield et al. | 382/104 |
| 8,130,242 B2* | 3/2012 | Cohen | 345/632 |
| 2002/0028665 A1* | 3/2002 | Mankovitz | 455/186.1 |
| 2002/0032035 A1* | 3/2002 | Teshima | 455/456 |
| 2003/0202683 A1* | 10/2003 | Ma et al. | 382/104 |
| 2004/0017482 A1* | 1/2004 | Weitman | 348/207.99 |
| 2004/0215377 A1* | 10/2004 | Yun | 701/28 |
| 2005/0180632 A1* | 8/2005 | Aradhye et al. | 382/182 |
| 2005/0187701 A1* | 8/2005 | Baney | 701/117 |
| 2005/0198095 A1* | 9/2005 | Du et al. | 709/200 |
| 2006/0009908 A1* | 1/2006 | Tomita et al. | 701/210 |
| 2007/0124027 A1* | 5/2007 | Betzitza et al. | 701/1 |
| 2007/0156336 A1* | 7/2007 | Chang | G01C 21/3415 701/414 |
| 2007/0233380 A1* | 10/2007 | Tanaka | 701/211 |
| 2007/0244632 A1* | 10/2007 | Mueller et al. | 701/202 |
| 2007/0288952 A1* | 12/2007 | Weinblatt | 725/23 |
| 2008/0089288 A1* | 4/2008 | Anschutz et al. | 370/331 |
| 2008/0109376 A1* | 5/2008 | Walsh et al. | 705/80 |
| 2009/0125226 A1* | 5/2009 | Laumeyer et al. | 701/200 |
| 2009/0232354 A1* | 9/2009 | Camp et al. | 382/103 |
| 2010/0030462 A1* | 2/2010 | Iwaji et al. | 701/201 |
| 2010/0045449 A1* | 2/2010 | Stein | 340/435 |
| 2010/0103263 A1* | 4/2010 | Kanning et al. | 348/148 |
| 2010/0312446 A1* | 12/2010 | Schofield et al. | 701/70 |

* cited by examiner

USER INTERFACE CONTROLLED BY ENVIRONMENTAL CUES

CROSS-REFERENCE TO RELATED PATENT APPLICATIONS

This application is a Continuation of U.S. patent application Ser. No. 13/750,894, filed on Jan. 25, 2013, which is a Continuation of U.S. patent application Ser. No. 11/965,136, entitled "USER INTERFACE CONTROLLED BY ENVIRONMENTAL CUES", filed Dec. 27, 2007, now issued as U.S. Pat. No. 8,370,755 on Feb. 5, 2013 the disclosures of which are incorporated herein by reference in their entireties.

BACKGROUND

The technology relates generally to user interfaces that control devices, such as radios, automobiles, navigation systems, and other types of devices.

User interfaces for controlling equipment, such as a car radio, are well known. Such interfaces may comprise various knobs, switches, and on-screen icons and buttons that control the selection of radio volume, station, and audio enhancements. The user typically makes selections by pressing the buttons, knobs, or icons on a touch-screen display. A user interface for controlling the speed of an automobile may include one or more switches or levers that are pressed to activate cruise control or to accelerate to a higher speed. A user interface for controlling a navigation system may include various icons and on-screen selectors for selecting a destination, re-routing to avoid a traffic condition, or requesting more information about a particular point of interest. A user interface on a mobile device such as a mobile phone may include a touch-screen display allowing numerals to be selected and buttons for initiating and terminating a telephone call.

It would be desirable to permit control of a user interface on the basis of environmental cues, such as visual cues like a traffic sign or information sign.

SUMMARY

This summary is not intended to identify any critical or key elements of the invention, but instead merely presents certain introductory concepts so that the full scope of the invention may be appreciated upon reading the full specification, of which this summary is a part.

One embodiment relates to a method comprising steps of receiving a signal containing an environmental cue; correlating the environmental cue to a user interface control element; and generating a user interface control command based on the environmental cue. An apparatus and computer-readable medium comprising executable instructions suitable for carrying out the method are also included.

One embodiment relates to a method for controlling a device by receiving a visual image, processing the image to identify a visual cue within the image, correlating the visual cue with a user interface control, and controlling a device using the user interface control. The visual image may be received from a camera that is part of an automobile, and the user interface control may include a control for a radio to tune to a radio station corresponding to a radio station visual cue; a speed control for controlling a speed of the automobile corresponding to a speed sign visual cue; or a navigation system control for controlling a navigation system based on traffic signs or other indicia in the image. In some embodiments, an object recognition algorithm identifies one or more visual cues from the image. In other embodiments, a user may select or highlight a visual cue from within the image in order to prompt the user interface. In certain embodiments, visual cues in an image may be matched to those stored in a database, wherein the visual cues are categorized according to country or region, each such country or region associated with different visual cues corresponding to a particular user interface command.

In yet other embodiments, instead of a visual image, an electromagnetic signal such as a radio signal may be received to provide an environmental cue, such as a radio signal that indicates a traffic condition or a radio station advertisement.

Another embodiment relates to an apparatus including a camera configured to receive a visual image, a processor configured to receive the visual image and to identify one or more visual cues in the visual image, and a user interface control configured to generate one or more commands for controlling equipment. In some embodiments, an image processing algorithm processes the image in order to identify one or more visual cues and to correlate such cues with one or more user interface control elements. In certain embodiments, a touch-screen display is used to display the visual image, to receive selection by a user of a visual cue, and to thereafter cause a control signal to be generated. The control signal may be used to control any of various parameters, such as the speed of an automobile in which the apparatus is located; the radio station to which a radio is tuned; or a navigation system.

Yet another embodiment relates to computer-readable media comprising executable instructions that, when executed by a processor or other device, perform one or more steps of various methods including those described above.

Other embodiments and variations will be apparent upon reading the detailed description set forth below, and the invention is not intended to be limited in any way by this brief summary.

DETAILED DESCRIPTION

Figure 1:
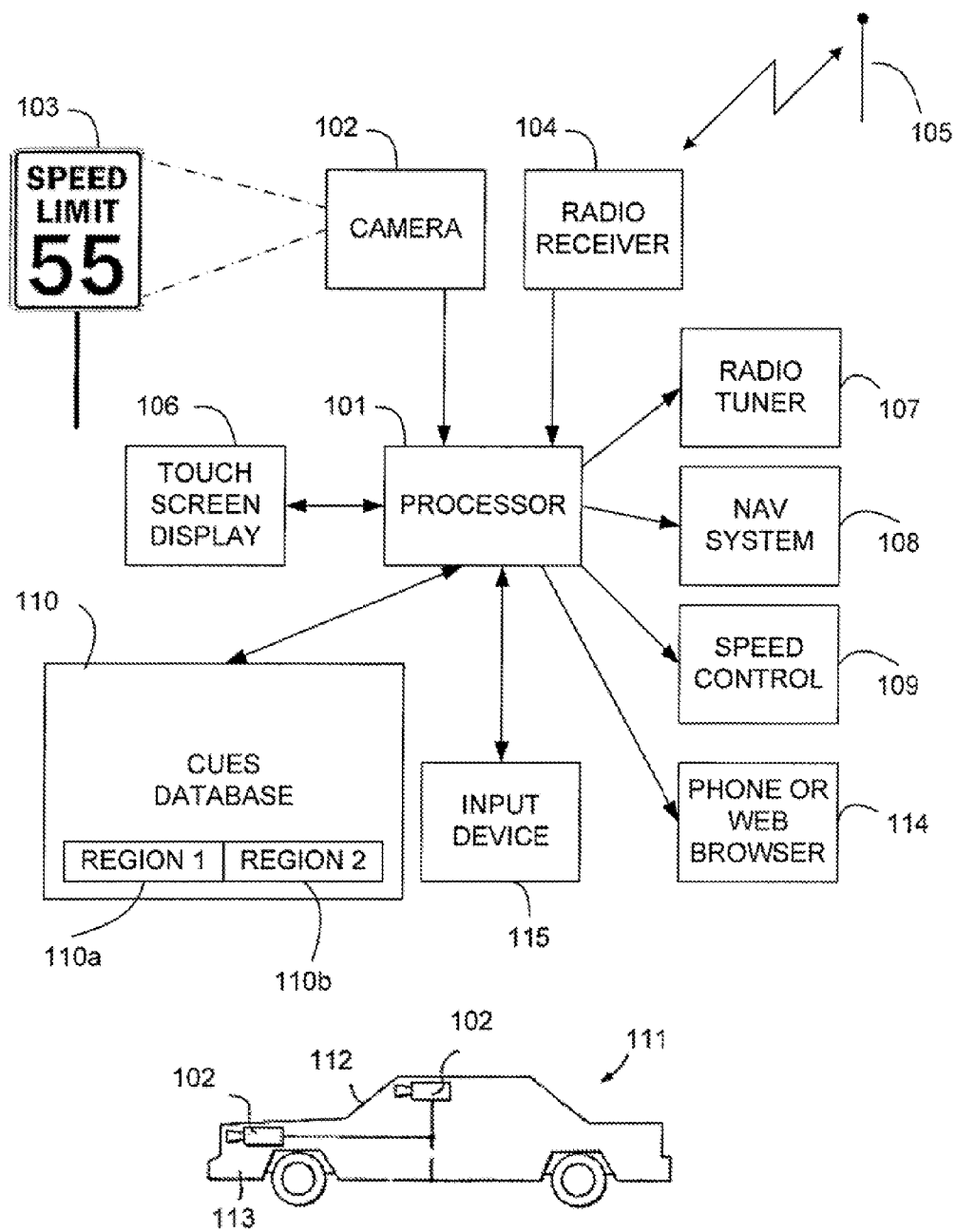
FIG. 1 shows an exemplary system according to certain embodiments of the invention.
Figure 2:
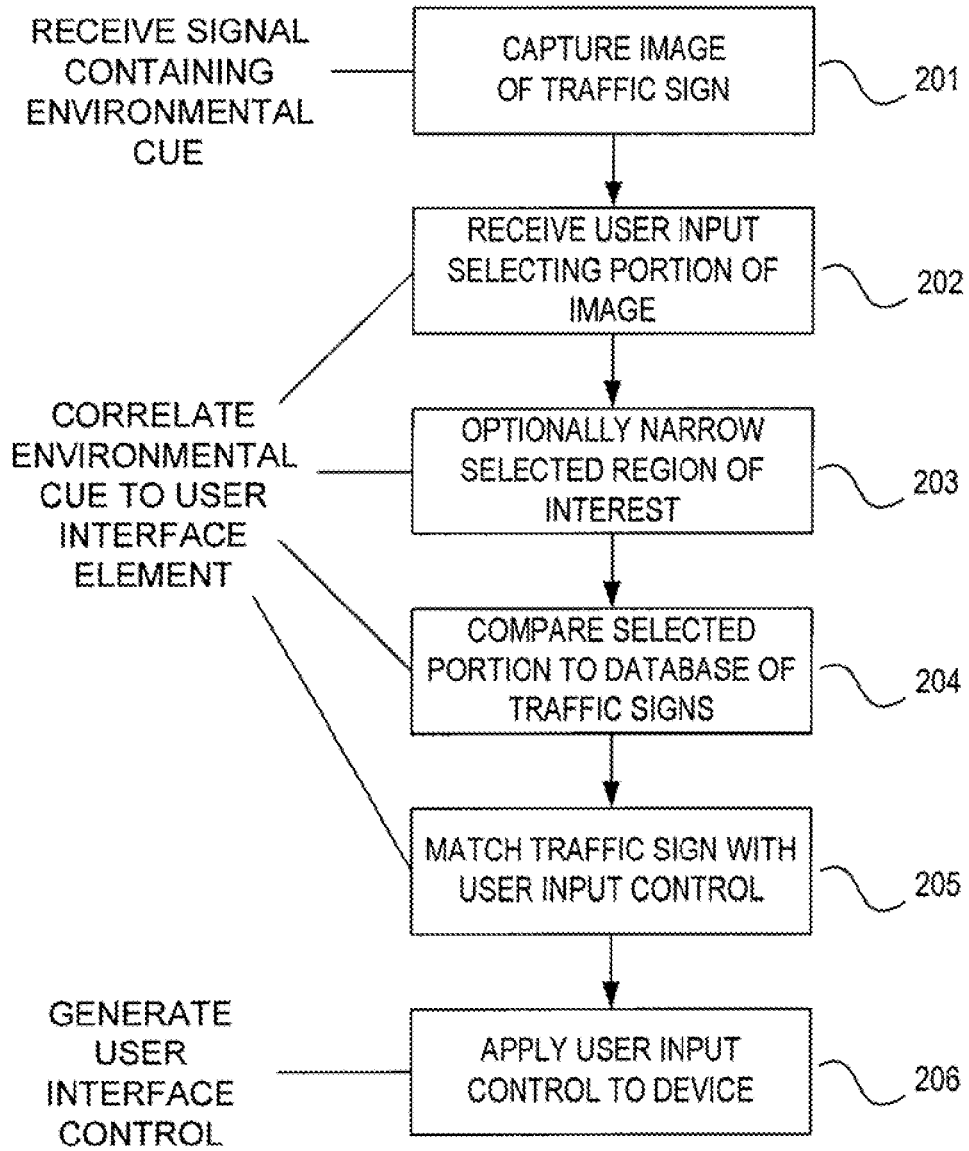
FIG. 2 shows a method including various steps that can be practiced according to certain embodiments of the invention.

FIG. 1 shows an exemplary system employing various principles according to one variation of the invention, and FIG. 2 shows an exemplary method including various steps that can be practiced according to the invention. The system in FIG. 1 includes one or more cameras 102 coupled to a processor 101, such as a general-purpose or specially programmed computer or equivalent circuitry. The camera 102 may be incorporated into a vehicle such as automobile 111 such that the camera picks up an image of the roadway and scenery through its windshield 112. Alternatively, camera 102 may be positioned within a body 113 of the vehicle so that it can capture images through a front portion of the automobile.

Camera 102 may be positioned so as to capture an image of a traffic sign 103, such as a speed limit sign. Images captured by camera 102 are processed in processor 101 and optionally displayed to a user as explained in more detail below. According to certain variations, portions of images captured by camera 102 are matched with one or more visual cues stored in a database in order to control one or more devices, such as radio tuner 107, navigation system 108, speed control system 109, or telephone 114.

A touch screen display 106 is also coupled to processor 101 in some embodiments in order to provide visual feedback, such as the current image captured by camera 102, and to receive user input and selection. A non-touch screen display, such as a conventional LCD or LED display, may be provided instead. User input may also be received from a different input device 115, such as a keypad, keyboard, buttons on a steering wheel, voice input unit, or the like. Processor 101 is also coupled to a cues database 110, which stores visual cue patterns, such as speed limit sign patterns. The cue patterns may be organized by different regions 110a and 110b, such that only a region corresponding to the location in which the automobile is traveling will be searched for visual cue patterns. Thus, for example, speed limit signs in one country may differ in appearance from speed limit signs in another country. Visual cues corresponding to speed limit signs may therefore be searched based on the country or region in which the automobile is traveling.

Optionally a radio receiver 104 may receive signals from a transmitter 105, which may be present to transmit advertisements or traffic-related information as explained in more detail below.

FIG. 2 shows various steps that can be carried out according to certain embodiments. The left side of FIG. 2 illustrates generic steps according to the method while more detailed steps are shown and described in corresponding boxes. Beginning in step 201, an image of a traffic sign is captured, such as when the automobile is traveling along a roadway. This corresponds generically to a step of receiving a signal containing an environmental cue. Other examples include receiving a radio signal containing traffic-related information, or receiving a signal containing an advertisement that may be specific to the environment in which an automobile is traveling (e.g., a nearby restaurant advertising a special meal). In one variation, the captured image is displayed on a display in an automobile or other vehicle, such as on touch-screen display 106 of FIG. 1.

Figure 3:
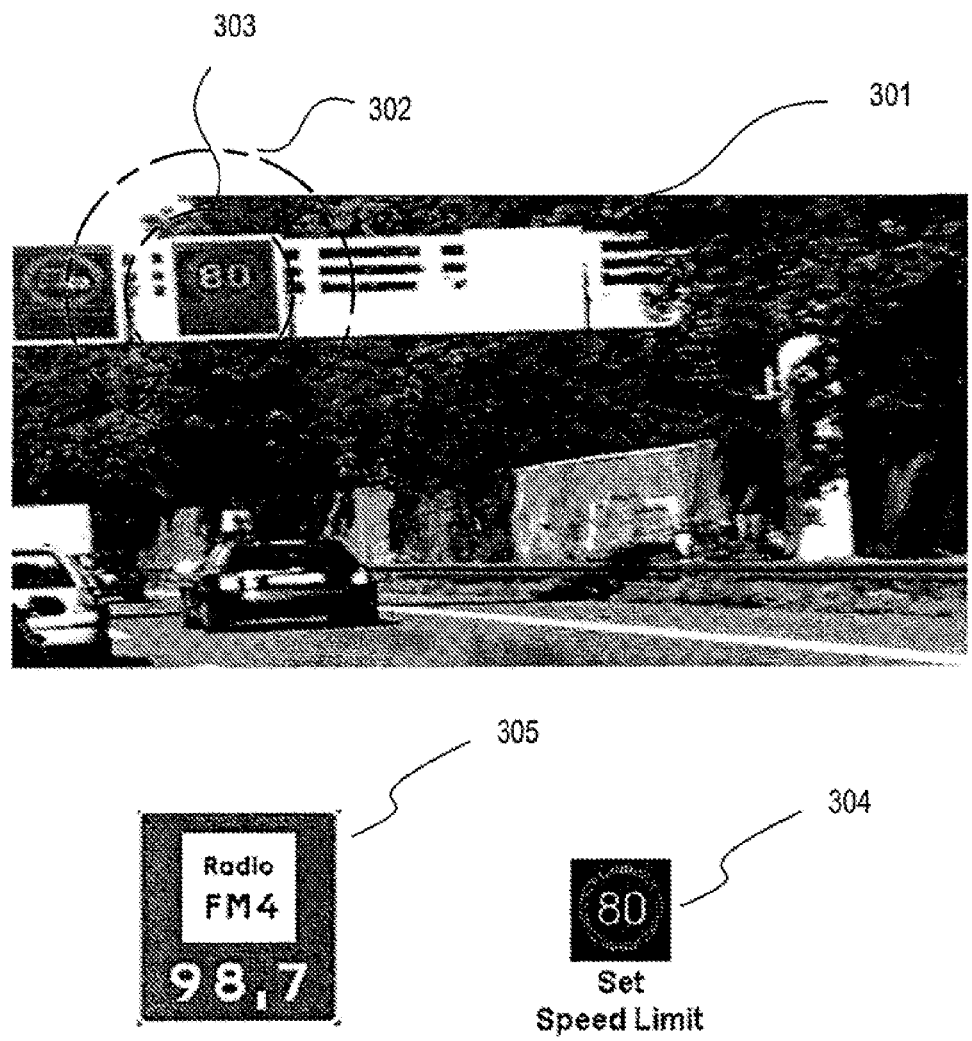
FIG. 3 shows one way of selecting a region of interest in a captured image and using the selected region to control a speed setting in a vehicle.

In step 202, user input is received indicating selection of a portion of the image. For example, as shown in FIG. 3, the captured image 301 may include a speed limit sign on an overhead sign. According to one variation, the user may press on the speed limit sign in the image in order to select it for further processing. In some embodiments, the image is not continuously displayed but instead is frozen at half-second or one-second intervals in order to give the user time to select a stationary portion on the image.

In one variation, corresponding to step 203 of FIG. 2, the region of interest may be narrowed. For example, pressing on the speed limit sign in the image may cause a first border 302 to be displayed around the pressed portion, and pressing a second time causes a smaller border 303 to be displayed, helping to isolate the desired portion of the sign. In other words, successively smaller borders corresponding to successively smaller regions of interest around where the user has pressed can be displayed and input to processor 101. This may make it easier for image-recognition software to isolate and recognize the speed limit sign contained in the image. After waiting a predetermined period of time after the last press, or upon further user input, processor 101 may lock in the last framed portion of the image as the basis for pattern matching. The image may be frozen during this selection process for ease of user comprehension.

In step 204, the selected portion of the image may be compared to a database of environmental cues, such as a database of traffic signs, in order to find a match. Any of various image-recognition techniques may be employed, and as indicated above and shown in FIG. 1, the database may be organized by country or region, such that only patterns relevant to the area being traveled will be matched. Examples of traffic sign recognition systems include U.S. Pat. No. 6,560,529; U.S. Pat. No. 6,801,638; and U.S. published application number 2006/0034484. Other systems can of course be used, and general image recognition and pattern matching algorithms are well-known.

In step 205, the recognized traffic sign is matched with a user input control. For example, if the selected portion of the image corresponds to a speed limit sign, a matching user input control element could be a SET SPEED LIMIT command to an automobile cruise control system, as illustrated by element 304 in FIG. 3. Other control elements could include RESUME or ACCELERATE or the like.

In one variation, different speed limit sign patterns are stored in database 110, each corresponding to a different speed limit (e.g., 80 kilometers per hour, 90 kilometers per hour, etc.). In other variations, a generic speed limit sign pattern may be detected and optical character recognition software may be used to decode the numeric speed limit contained in the sign. Of course, traffic sign shapes and configurations may vary from one country to the next, so the illustrated signs are not intended to be limiting.

Steps 202 through 205 collectively correspond to a generic step of correlating an environmental cue to a user interface element.

Finally, in step 206, the user input control is applied to the device, such as the cruise control system of the automobile. The user input control may be transmitted to various devices such as on-board systems over any of various means, such as a control bus, wireless link, or the like.

To the extent that more than one type of user input control matches or is applicable, a menu of options can be presented to the user, allowing for easy selection from among a set of choices.

Instead of a touch-screen display, a conventional LCD or LED display may be used, and user input may be received by way of voice control or buttons (e.g., on the steering wheel) to select options and to navigate around portions of the display.

Another type of environmental cue comprises a sign indicating a radio station that is available in the area in which an automobile is traveling. As shown in FIG. 3, for example, a radio sign 305 may indicate an FM frequency (98.7 MHz) to which a radio tuner can be tuned. As with the traffic sign, the user may press on the radio sign while it is part of image 301, causing processor 101 to select that portion of the image (or successively smaller portions as explained above), after which radio tuner 107 will be automatically tuned to the frequency contained in the radio sign. Optical character recognition software can be used to recognize the frequency and band to which the radio should be tuned.

Yet another type of environmental cue comprises a dynamic traffic alert, such as an ACCIDENT AHEAD, TRAFFIC AHEAD, or CONSTRUCTION ZONE sign that is presented to drivers traveling along a road. In one variation of the invention, such dynamic traffic alerts can be recognized by processor 101 and used to generate a DETOUR command to a navigation system 108. Consequently, the driver need not be distracted from driving by navigating through a hierarchy of menus on the touch-screen of the navigation system, but can instead be prompted to immediately cause the navigation system to enter its detour mode.

Yet another type of environmental cue comprises a sign containing information concerning a tourist attraction, such as a museum or park. In accordance with one variation of the invention, upon selecting such a sign in the displayed image, processor 101 can generate a search command in a navigation system 108 in order to cause the navigation system to plan a route to the indicated attraction based on the name of the attraction or a telephone number contained on the sign. If a website address is displayed on a sign, processor 101 may automatically generate a web query to retrieve a webpage corresponding to the website and display it on touch screen display 106 or on another display. Wireless links, such as a wireless telephone network or other type of network, may be accessed by processor 101 according to certain embodiments if needed to access such websites. If a telephone number is included on the sign, the user can be prompted to automatically dial the telephone number by pressing a button or pressing on a displayed message offering to dial the number. This provides an easy one-touch or two-touch way of dialing a telephone number (one touch to select the sign, and a second touch to activate dialing of the telephone number).

As another example, an airport sign along a road may show an airplane symbol (e.g., a black airplane on a white background) and such a symbol can be detected and used in connection with current position information to generate a website address corresponding to the particular airport, which is then provided to phone/web browser 114 (see FIG. 1) to query the corresponding website corresponding to the airport. In some variations, additional information such as the name of the airport or city name on the sign may also be used to recognize the airport and to correlate the airport to a website address. The user may then enter pertinent information such as a flight number in the web page, causing relevant flight status or other information to be displayed.

In certain variations, the sign itself may include a telephone number or website providing a link to flight information, flight schedules, terminal information, or parking availability. Selection of the sign as a visual cue causes the system to link to the website or call the indicated telephone number for information. In one embodiment, upon displaying a webpage corresponding to the visual cue, the user may provide additional information (e.g., flight number and airline via voice input or numeric keypad or keyboard) to obtain the latest flight or parking status. Additionally, a webpage may show the cheapest or most abundant parking lots, which upon selection by the user can be provided as a destination address to the navigation system. To the extent that information is pre-stored or transferred from a mobile device via short-range radio or infrared means, it can also be provided as an input to the website and to as an input to the navigation system.

Figure 4:
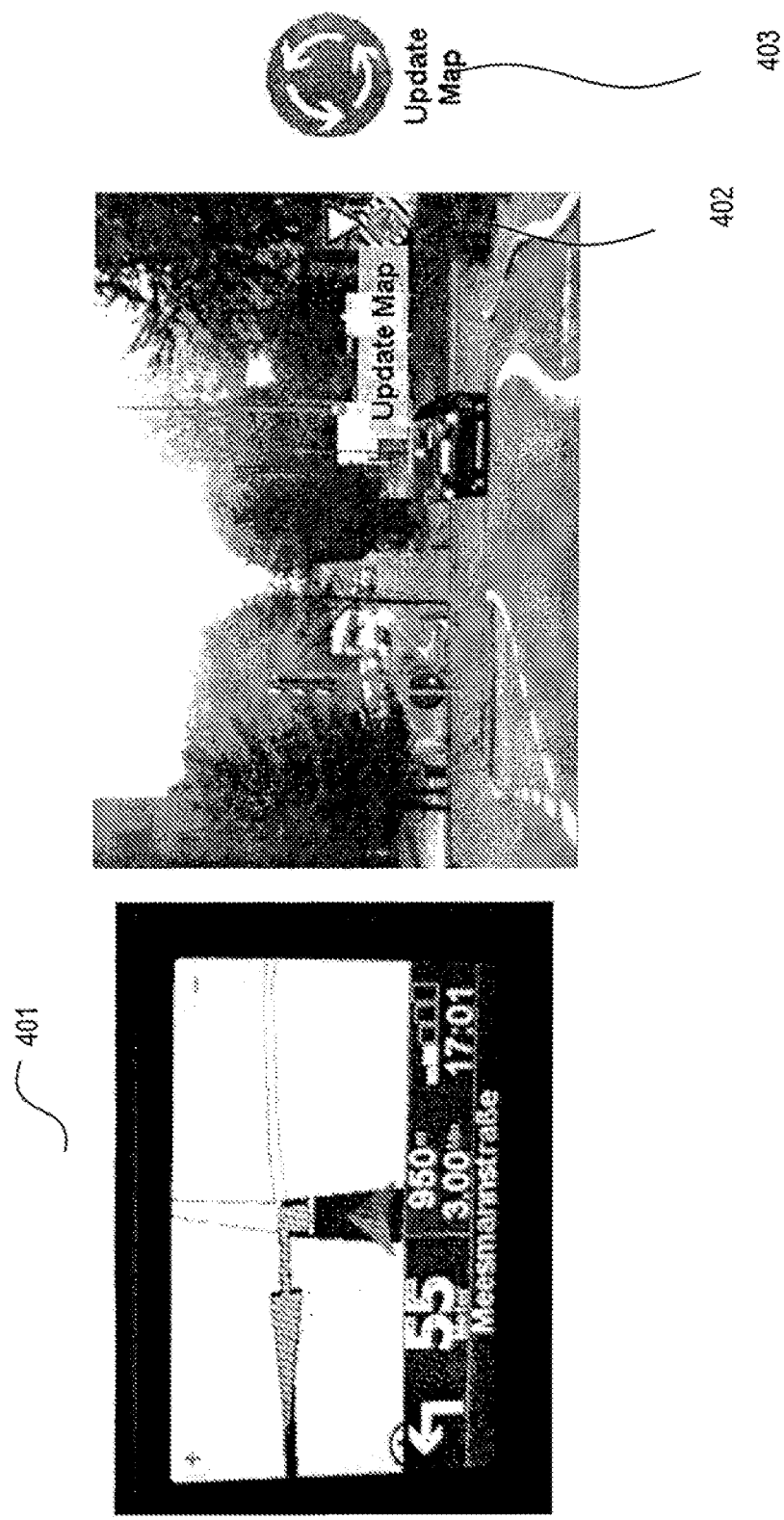
FIG. 4 shows one way of updating navigational information based on a received visual image.

Yet another type of environmental cue comprises a traffic routing sign, such as a roundabout (traffic circle) sign. Sometimes the navigation system may not have the latest road patterns or turns. As shown in FIG. 4, for example, a navigation system display 401 may show a sharp left turn in the road ahead. Based on the road image, however, a new roundabout sign 402 is evident in the display. By selecting the sign and confirming UPDATE MAP on the touch-screen display, processor 101 may store the location of the update and the updated information (e.g., roundabout), such that future visits to the area cause the updated information to be displayed on the touch-screen display.

Figure 5:
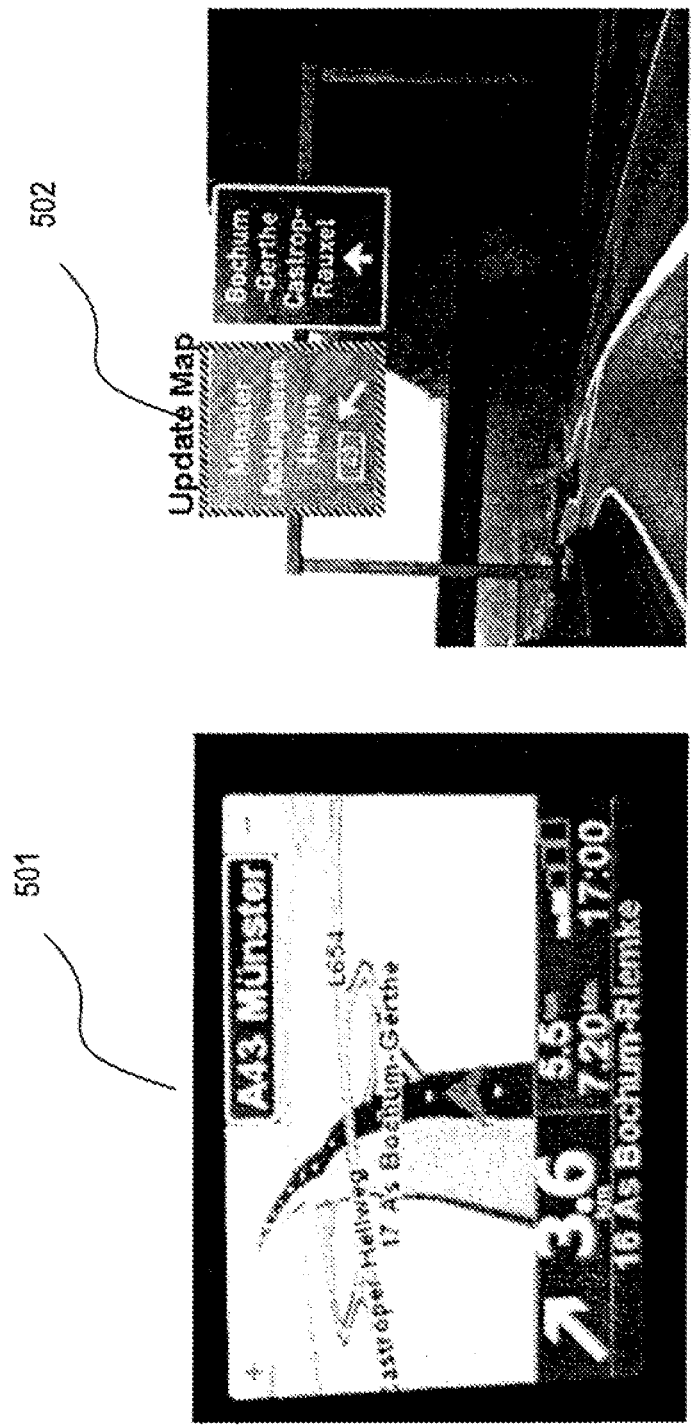
FIG. 5 shows another way of updating navigational information based on a received visual image.

FIG. 5 illustrates another example wherein an image displayed by a navigation system 501 does not include a new road sign 502 indicating another option for travel. As explained above, pressing on the sign may generate an UPDATE MAP command to the navigation system, or the updated information may be stored separately by processor 101 and retrieved when traveling near the updated region.

In yet other embodiments, instead of visual cues, the dynamic location of a vehicle or user with a mobile device can be used to automatically match user interface controls associated with the location. For example, cues database 110 of FIG. 1 may be arranged to contain information regarding radio station frequencies that are available within a particular region or area. As the user moves to a different region, processor 101 may prompt the user with options to tune to radio stations within that region, and thereafter cause radio tuner 107 to be tuned to a selected station.

In yet other embodiments, radio signals may be received from a transmitter 105 to a radio receiver 104 (see FIG. 1) comprising information such as traffic conditions, operating hours for tourist attractions, or other information. In some embodiments, this information is used to provide user interface control to one or more devices, such as navigation system 108. For example, a traffic alert may be transmitted by radio signal and received by receiver 104. As another example, information regarding a telephone number of a nearby museum may be transmitted over a radio station frequency (via Radio Data System (RDS) or another transmission scheme) and picked up by radio receiver 104 and used to program navigation system 108. As is well known, navigation systems are often able to program a destination based on a telephone number. Consequently, instead of the user having to enter the telephone number into the navigation system, the telephone number is extracted from a radio signal and used to prompt the user whether to program the navigation system to plot a route to a destination.

As explained above, in certain embodiments different regional cues databases 110a and 110b may be active. As the vehicle travels through different regions or countries, different cues databases may become activated in order to narrow the possible matching patterns that are used to compare with portions of images received from the camera.

In yet another variation, the inventive principles are applied not in an automobile context but in a mobile device such as a mobile telephone, personal digital assistant (PDA), mobile computer, and the like. For example, a pedestrian walking along a road can aim a camera at a road sign, such as a sign advertising a radio station, and cause a radio tuner on the mobile device to be tuned to the advertised frequency. As another example, a user may aim a camera contained within a mobile device at a sign advertising a taxi service including a telephone number, and processor 101 upon extracting the telephone number from the image may issue a dial command to a telephone 114 as illustrated in FIG. 1. A website address (i.e., beginning with "www") may also be recognized as used to generate a website address for input into a web browser 114, which may be combined with a mobile telephone.

For example, a user may aim a mobile device at a bus-stop or underground railway sign and obtain access to the time table of the public transportation system. This could include positioning in case the user cannot identify from the sign which bus stop he or she is pointing at. This could be useful in areas where the time tables are unreadable for some reason (e.g., dirty or damaged). This could also be useful in areas where the user is able to obtain information about bus or train delays from a website, allowing the user to choose between different alternatives.

The term "environmental cue" may include, among other things, a traffic sign or advertising sign contained in a received image; a radio signal comprising information relating to a location or other information such as telephone numbers; or current position information. Current position information may be obtained from a GPS receiver or other means.

Many variations of the inventive principles are possible. The method steps described herein can be implemented in computer software and encoded on computer-readable media for execution by a computer processor or specialized circuit, and the invention includes such computer-readable media.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), application specific integrated circuits (ASIC), and the like. The terms "processor" and "memory" comprising executable instructions should be interpreted individually and collectively to include the variations described in this paragraph and equivalents thereof.

Embodiments include any novel feature or combination of features disclosed herein either explicitly or any generalization thereof. While embodiments have been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

What is claimed is:

1. A method comprising:
   capturing a visual image of a traffic sign by a camera;
   receiving a user input for selecting the visual image for correlation;
   in response to the user input for selecting the visual image, correlating, by the processor, the visual image to at least one interface control element for operating at least one of a radio device, a telephone device, a web browser device, a speed control device, and a navigation device;
   displaying a set of options applicable to the at least one interface control element for the at least one device, the options comprising:
   a speed control command for the speed control device when the visual image correlates to a speed limit sign,
   a detour command for the navigation device when the visual image correlates to a traffic alert, and
   a dial command for the telephone device when the visual image correlates to a telephone; and
   in response to a user selection of one of the set of options, performing a corresponding command.

2. The method of claim 1, further comprising causing the navigation device to enter a detour mode to plan an alternate route in response to selection of the detour command.

3. The method of claim 1, wherein the options further comprise a web page loading command for the web browser device when the visual image correlates to a website address.

4. The method of claim 1, wherein the options further comprise an update map command for the navigation device when the visual image correlates to traffic routing sign.

5. The method of claim 1, wherein correlating comprises receiving user input regarding a user-selected portion of the visual image corresponding to the received signal.

6. The method of claim 5, wherein correlating further comprises the correlation to the user-selected portion of the visual image.

7. The method of claim 1, wherein correlating comprises matching a visual cue within the captured image to one of a plurality of potentially matching visual cues stored in a database.

8. An apparatus comprising:
   a display configured to display a user interface;
   a user interface for receiving user inputs;
   a camera configured to capture a visual image of a traffic sign; and
   a processor configured to:
   receive a user input via the user interface for selecting the visual image for correlation,
   in response to the user input for selecting the visual image, correlate the visual image to an at least one interface control element for operating at least one of a radio device, a telephone device, a web browser device, a speed control device, and a navigation device
   display a set of options applicable to the at least one interface control element for the at least one device, the options comprising:
   a speed control command for the speed control device when the visual image correlates to a speed limit sign,
   a detour command for the navigation device when the visual image correlates to a traffic alert, and
   a dial command for the telephone device when the visual image correlates to a telephone number, and
   in response to a user selection of one of the set of options, performing a corresponding command.

9. The apparatus of claim 8, wherein the processor is further configured to cause the navigation device to enter a detour mode to plan an alternate route in response to selection of the detour.

10. The apparatus of claim 9, wherein the options further comprise a web page loading command for the web browser device when the visual image correlates to a website address.

11. The apparatus of claim 9, the options further comprise an update map command for the navigation device when the visual image correlates to traffic routing.

12. The apparatus of claim 9, further comprising a database configured to store visual cue patterns, wherein the processor is further configured to match a visual cue within the captured image to one of a plurality of potentially matching visual cues stored in the database.

13. The apparatus of claim 12, wherein the visual cues are organized by geographic region.

14. A non-transitory computer-readable medium storing executable instructions configured to, when executed, cause a processor to:
- receive a visual image of a traffic sign by a camera;
- receive a user input via the user interface for selecting the visual image for correlation;
- in response to the user input for selecting the visual image, correlate the visual image to at least one interface control element for operating at least one of a radio device, a telephone device, a web browser device, a speed control device, and a navigation device;
- display a set of options applicable to the at least one interface control element for the at least one device, the options comprising:
  - a speed control command for the speed control device when the visual image correlates to a speed limit sign,
  - a detour command for the navigation device when the visual image correlates to a traffic alert, and
  - a dial command for the telephone device when the visual image correlates to a telephone number; and
- in response to a user selection of one of the set of options, performing a corresponding command.

15. The computer-readable medium of claim 14, wherein the executable instructions configured to, when executed, cause a processor to cause the navigation device to enter a detour mode to plan an alternate route in response to selection of the detour command.

16. The computer-readable medium of claim 15, wherein the options further comprise a web page loading command for the web browser device when the visual image correlates to a website address.

17. The computer-readable medium of claim 15, wherein the options further comprise an update map command for the navigation device when the visual image correlates to traffic routing sign.

18. The computer-readable medium of claim 15, wherein the options further comprise an update map command for the navigation device when the visual image correlates to traffic routing sign.

19. The computer-readable medium of claim 15, wherein the executable instructions configured to, when executed, cause a processor to match a visual cue within a received image to one of a plurality of potentially matching visual cues stored in a database.

* * * * *